(12) United States Patent
Miyata et al.

(10) Patent No.: US 6,589,131 B2
(45) Date of Patent: Jul. 8, 2003

(54) SHIFT CONTROLLING METHOD OF A TRANSMISSION

(75) Inventors: Hideki Miyata, Okazaki (JP); Yasuo Hojo, Nagoya (JP); Hideo Tomomatsu, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/076,479

(22) Filed: Feb. 19, 2002

(65) Prior Publication Data

US 2002/0115527 A1 Aug. 22, 2002

(30) Foreign Application Priority Data

Feb. 20, 2001  (JP) ........................ 2001-043415

(51) Int. Cl.[7] ............................ F16H 61/02; B60K 41/04
(52) U.S. Cl. ................................. 477/34; 477/111
(58) Field of Search ........................... 477/34, 93, 94, 477/97, 111, 114

(56) References Cited

U.S. PATENT DOCUMENTS

| 3,937,105 A | 2/1976 | Arai et al. ............ 477/125 |
| 4,558,612 A | * 12/1985 | Shimizu et al. ............ 477/97 |
| 4,709,793 A | 12/1987 | Sakakibara et al. |
| 4,892,014 A | 1/1990 | Morell et al. ............ 477/92 |
| 4,939,502 A | 7/1990 | Ito et al. |
| 5,265,022 A | 11/1993 | Chonan et al. |
| 5,696,679 A | 12/1997 | Marshall et al. |
| 6,149,546 A | 11/2000 | Tabata et al. ............ 477/125 |
| 6,190,284 B1 | * 2/2001 | Kuroda et al. ............ 477/107 |
| 6,256,568 B1 | * 7/2001 | Siepker et al. ............ 701/62 |
| 6,321,530 B1 | * 11/2001 | Hoshi et al. ............ 60/274 |
| 6,371,889 B1 | * 4/2002 | Kuroda et al. ............ 477/181 |

FOREIGN PATENT DOCUMENTS

| DE | 198 50 374 | 5/2000 |
| DE | 199 60 334 | 7/2000 |
| EP | 0 972 667 | 1/2000 |
| JP | 10-089451 | 4/1998 |
| JP | 10-103465 | 4/1998 |
| JP | 10-141489 | 5/1998 |
| JP | 10-153254 | 6/1998 |

OTHER PUBLICATIONS

Patent Abstracts of Japan, JP 4–302770, Oct. 26, 1992.

* cited by examiner

Primary Examiner—Sherry Estremsky
(74) Attorney, Agent, or Firm—Olblon, Spivak, McClelland, Maier & Neustadt, P.C.

(57) ABSTRACT

A method for controlling gear shifting of a transmission in a vehicle. The transmission is supplied with electric power from a battery or an alternator and drives an actuator to shift gear ranges of the transmission. The transmission has an output shaft that becomes difficult to rotate if a predetermined range is selected when the engine stops running. The method includes determining whether a gear range differing from the predetermined range is selected when the vehicle stops traveling, and forcibly shifts the gear range to the predetermined range when a gear range differing from the predetermined range is selected by driving the actuator with electric power supplied from the alternator.

10 Claims, 2 Drawing Sheets

SHIFT CONTROLLING METHOD OF A TRANSMISSION

BACKGROUND OF THE INVENTION

The present invention is related to a shift controlling method of a transmission, and more particularly, to a shift controlling method of a transmission that detects an operation condition of a shift lever, drives an actuator based on the detection result, and switches a gear range of the transmission.

An automatic transmission of a vehicle shifts gears based on the speed, the opened degree of the throttle valve, and other parameters. A driver operates a shift lever of a shift device that is mechanically connected to a manual valve of an automatic transmission to select a gear range, such as a P (parking) range, an R (reverse) range, an N (neutral) range, a D (drive) range. The mechanical connection of the automatic transmission and the shift device limits the position where the shift lever of the shift device is arranged. Therefore, in the prior art, the shift lever is arranged near the automatic transmission, for example, on a floor or on a steering column.

A shift-by-wire type shift device that electrically shifts ranges has been proposed. For example, Japanese Laid-Open Patent Publication No. 10-103465 describes a controller of an automatic transmission. When a shift position sensor electrically detects the position of the shift lever, in response to the detection signal, the controller drives a range shifting motor that receives electric power from a battery or an alternator. The power moves a manual valve of the automatic transmission and shifts the gear range. Because the shift lever is not mechanically connected to the manual valve in this controller, the position of the shift device is not limited, and other on-vehicle equipment may be arranged freely.

However, the employment of the controller results in the following shortcoming. When the engine is running, the motor is provided with electromotive force of the alternator, which is connected to the crankshaft. Therefore, the motor shifts the gear range even if a terminal of the battery falls off when the vehicle is moving or if the battery is not functioning normally, such as when the battery power becomes insufficient. However, if the engine stops when the battery is not functioning normally, the rotation of the alternator stops. This stops the generation of electricity. As a result, the motor stops functioning and the gear range cannot be shifted.

For example, if the engine is stopped when a gear range other than the P range (e.g., the N range) is selected and the driver then selects the P range with the shift lever, the driver would believe that a parking lock mechanism is functioning since the shift lever is located at the P range. However, the manual valve of the automatic transmission is actually not moved and the gear range is not shifted to the P range. Therefore, the parking lock mechanism is not functioning and the drive wheels are not locked. If the driver goes away from the vehicle in this condition, the vehicle may start to move depending on the circumstances of where the vehicle is parked without the driver knowing. This problem occurs not only with automatic transmissions but also with manual transmissions that employ shift-by-wire systems.

SUMMARY OF THE INVENTION

It is an object of the present invention to provide a shift controlling method of a transmission that prevents the gear range from being maintained in a range other the parking range when a battery is not functioning normally.

It is a further object of the present invention to provide a shift controlling method of a transmission that prevents a driver from going away from a vehicle when the gear range is not shifted to the parking range when the battery is not functioning normally.

To achieve the above object, the present invention provides a method for controlling gear shifting of a transmission connected to an engine of a vehicle. The transmission is supplied with electric power from a battery or an alternator, which is connected to the engine, and drives an actuator based on manipulation of a shifting member by a driver to shift gear ranges of the transmission. The transmission has an output shaft that becomes difficult to rotate if a predetermined range is selected when the engine stops running. The method includes determining whether a gear range differing from the predetermined range is selected by the manipulation of the shifting member when the vehicle stops traveling, and forcibly shifting the gear range of the transmission to the predetermined range when a gear range differing from the predetermined range is selected by driving the actuator with electric power supplied from the alternator.

A further perspective of the present invention is a method for controlling gear shifting of a transmission connected to an engine of a vehicle. The transmission is supplied with electric power from a battery or an alternator, which is connected to the engine, and drives an actuator based on manipulation of a shifting member by a driver to shift gear ranges of the transmission. The transmission has an output shaft that becomes difficult to rotate if a predetermined range is selected when the engine stops running. The method includes detecting the condition of the battery, determining whether a gear range differing from the predetermined range is selected by the manipulation of the shifting member when the vehicle stops traveling, and prohibiting the stopping of the engine when, based on the condition of the battery, the battery does not supply enough electric power to drive the actuator and a gear range differing from the predetermined range is selected.

A further perspective of the present invention is a controller for controlling gear shifting of a transmission connected to an engine of a vehicle. The controller is supplied with electric power from a battery or an alternator, which is connected to the engine, and drives an actuator based on manipulation of a shifting member by a driver to shift gear ranges of the transmission. The transmission has an output shaft that becomes difficult to rotate if a predetermined range is selected when the engine stops running. The controller includes a control unit for determining whether a gear range differing from the predetermined range is selected by the manipulation of the shifting member when the vehicle stops traveling. The control unit forcibly shifts the gear range of the transmission to the predetermined range when a gear range differing from the predetermined range is selected by driving the actuator with electric power supplied from the alternator.

A further perspective of the present invention is a controller for controlling gear shifting of a transmission connected to an engine of a vehicle. The controller is supplied with electric power from a battery or an alternator, which is connected to the engine, and drives an actuator based on manipulation of a shifting member by a driver to shift gear ranges of the transmission. The transmission has an output shaft that becomes difficult to rotate if a predetermined range is selected when the engine stops running. The controller includes a control unit for detecting the condition of the battery, determining whether a gear range differing from the predetermined range is selected by the manipulation of the shifting member when the vehicle stops traveling, and prohibiting the stopping of the engine when, based on the condition of the battery, the battery does not supply enough electric power to drive the actuator and a gear range differing from the predetermined range is selected.

Other aspects and advantages of the present invention will become apparent from the following description, taken in conjunction with the accompanying drawings, illustrating by way of example the principles of the invention

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
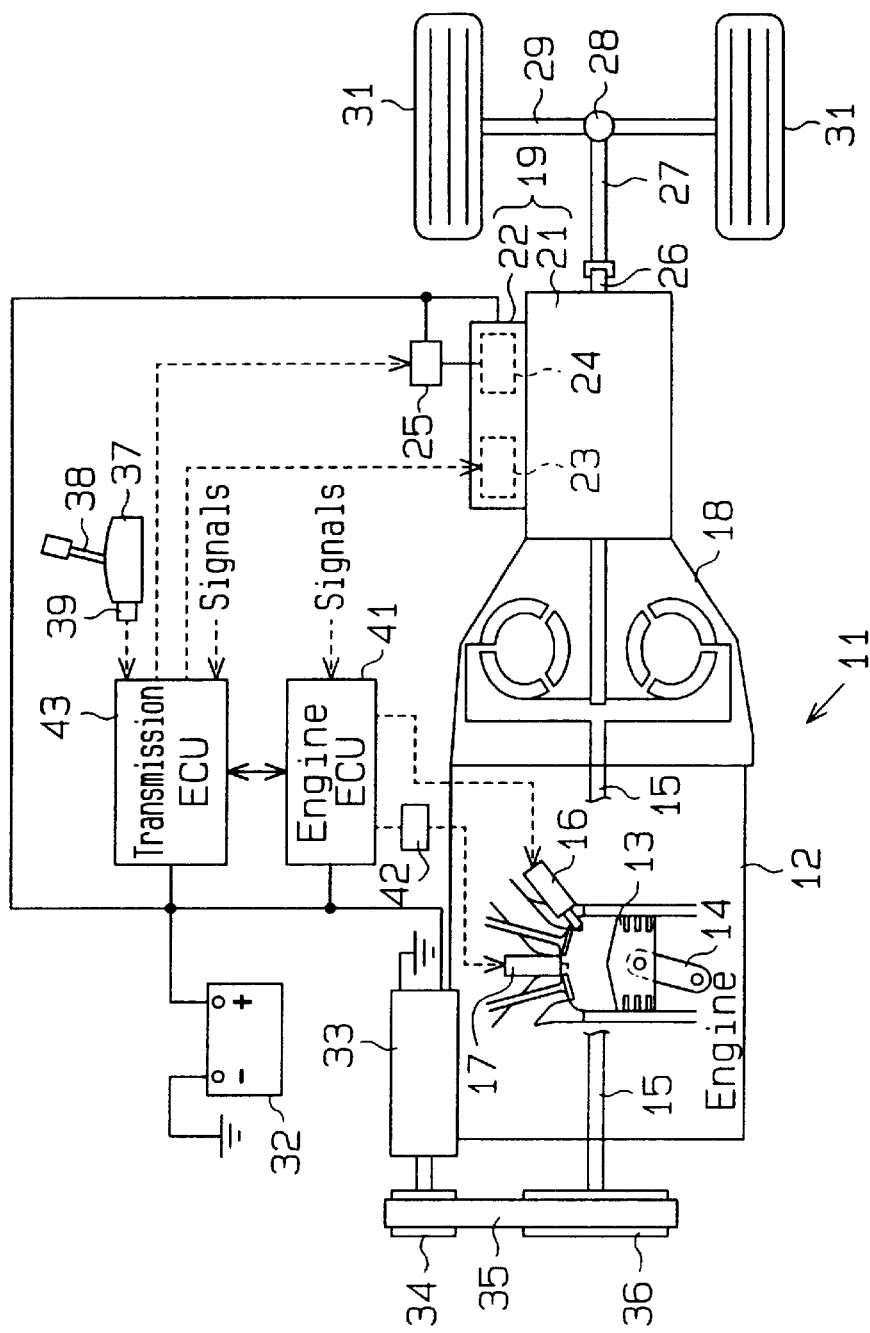
FIG. 1 is a schematic diagram of a vehicle in which a shift controlling method of a transmission according to a preferred embodiment of the present invention is applied.

Hereinafter, a shift control method of a transmission according to a preferred embodiment of the present invention will be explained referring to the drawings. As shown in FIG. 1, an engine 12 is mounted on a vehicle 11. The engine 12 uses gasoline as fuel and the reciprocation of pistons 13 in the engine 12 is converted to rotational motion by a connecting rod 14. The rotational motion is transferred to a crankshaft 15, which functions as an output shaft, of the engine 12. Fuel injected from fuel injection valves 16 is mixed with intake air flowing through an intake passage into an air-fuel mixture. Electric sparks of ignition plugs 17 ignite and burn the air-fuel mixture. This produces hot combustion gas and high pressure that reciprocates the pistons 13 and rotates the crankshaft 15. The power (output torque) of the engine 12 is produced in this manner. A different type of engine may also be employed as the engine 12.

The crankshaft 15 is connected to an automatic transmission (AT) 19 by a torque converter 18. The torque converter 18 amplifies the output torque of the engine 12 using the flow of a fluid (oil) and transmits the amplified torque to the automatic transmission 19. The automatic transmission 19 has a planetary gear unit 21 and a hydraulic pressure control unit 22. In the planetary gear unit 21, two of the three kinds of gears, which include a sun gear, a pinion gear, and a ring gear, are combined and rotated by a clutch and a brake, which are operated by hydraulic pressure, to change gear ratios.

The hydraulic pressure control unit 22 has a hydraulic circuit for setting gear ranges and gears. The gear ranges include, for example, a P (parking) range, an R (reverse) range, an N (neutral) range, and a D (drive) range. When the P range, which serves as a predetermined range, is selected from the gear ranges, a parking lock mechanism functions and engages a latch, which is referred to as a parking pawl, with a parking gear arranged on the output shaft 26 of the automatic transmission 19. This prohibits rotation of the output shaft 26. The gears include a plurality of forward gears and a reverse gear.

The hydraulic circuit includes various valves, such as a shift valve and a pressure control valve (not shown), and solenoid valves 23, which are electromagnetic valves. The valves adjust the hydraulic pressure by opening and closing the hydraulic circuit based on their positions. The solenoid valves 23 output signal pressure to switch the positions of the various valves.

The hydraulic pressure control unit 22 includes a manual valve 24 that shifts the gear ranges by switching line pressure passages. A motor 25, which is an electric actuator, is mechanically connected to the manual valve 24 by a transmission mechanism. The motor 25 operates to move the manual valve 24 and shift the gear range.

The output shaft 26 of the automatic transmission 19 is connected to drive wheels 31 by a drive shaft 27, a differential gear 28, and an axle 29. The rotation of the output shaft 26 is transmitted to the drive wheels 31 by the drive shaft 27, the differential gear 28, and the axle 29.

A battery 32 and an alternator 33, which supply electric loads with power, are arranged in the vehicle 11. The alternator 33 is connected to the crankshaft 15 by a pulley 34, a transmission belt 35, and a pulley 36 and is rotated by the engine 12 to generate electric power. The electric power generated by the alternator 33 is supplied to each electric load and to the battery 32.

A shift manipulation unit 37 is arranged near a driver's seat in the vehicle (for example, on the floor between the driver's seat and a front passenger seat, on the door next to the driver's seat, or on a steering column). The shift manipulation unit 37 may be arranged in one or more locations. Further, the shift manipulation unit 37 may be arranged anywhere. The shift manipulation unit 37 includes a shift lever 38 and a shift position sensor 39. A driver shifts the shift lever 38 to select a gear range in the automatic transmission 19. The shift lever 38 is, for example, inclinably moved in a cross-like groove. The driver shifts the shift lever 38 to select the desired gear range. The shift position sensor 39 electrically detects the shift position of the shift lever 38 and generates a detection signal.

An electronic control unit (ECU) 41 for controlling the engine 12 is arranged in the vehicle 11. The ECU 41 includes a central processing unit (CPU) that performs calculations based on control programs, which are stored in a read only memory (ROM), using initial data and control maps and performs various controls based on the calculation. The calculation of the CPU is temporarily stored in a random access memory (RAM). The various controls include, for example, fuel injection control and ignition timing control. During the fuel injection control, the ECU 41 drives the fuel injection valves 16 based on signals from various sensors to inject fuel. During the ignition timing control, the ECU 41 controls an igniter 42 based on signals from various sensors to ignite the ignition plugs 17.

A transmission ECU 43, which controls the automatic transmission 19, is provided in the vehicle 11. The ECU 43 includes a CPU, a RAM, and a ROM. The ECUs 41, 43 are connected with each other to communicate data. The control of the ECU 43 includes, for example, a gear range shifting control and a gear shifting control. During the gear range shifting control, the ECU 43 controls the motor 25 based on the detection signal of the shift position sensor 39, and moves the manual valve 24 to a predetermined position. That is, the gear range is shifted to the range selected by the shift lever 38. During the gear shifting control, when the shift lever 38 moves the manual valve 24 to a predetermined position (for example, a position corresponding to the D range), the ECU 43 adjusts a range pressure based on the vehicle speed and the engine load (e.g., the opened degree of the throttle) and controls the actuation and de-actuation of each solenoid valve 23 to shift the gear.

Next, the shift control of the automatic transmission 19 will be explained. The ECU 43 executes the shift control routine shown by the flowchart of FIG. 2. The shift control routine is commenced when the engine 12 is started and executed repeatedly every predetermined period. A stop prohibition flag F is used in the shift control routine. The stop prohibition flag F is used to determine whether or not the stopping of the engine 12 is prohibited. The stop prohibition flag F is set to 0 when the battery 32 is normal or when the battery 32 is abnormal and the P range is selected by the shift lever 38. The stop prohibition flag F is set to 1 when the battery 32 has an abnormality and a range other than the P range is selected. An abnormality of the battery 32 refers to a state in which the battery 32 cannot properly operate the motor 25. The initial value (the value when the engine starts) of the stop prohibition flag F is 0.

First, the ECU 43 determines whether or not the battery 32 has an abnormality in S110. That is, it is determined whether the battery 32 has an abnormality based on "whether the power of the battery 32 is insufficient and the amount of electric power supply from the battery 32 to the motor 25 is decreasing" or "whether the electric power supply to the motor 25 is cut." More specifically, it is determined whether the battery 32 has an abnormality based on whether the voltage of the battery 32 is greater than a predetermined value. When the voltage of the battery 32 is greater than the predetermined value, the ECU 43 determines that the battery 32 is normal, and when the voltage of the battery 32 is less than or equal to the predetermined value, the ECU 43 determines that the battery 32 is abnormal. The electric power supply is cut off, for example, when a terminal falls off from the battery 32.

When the condition of S110 is satisfied (the battery 32 being abnormal), the ECU 43 proceeds to S120 and determines whether or not the gear range selected by the shift lever 38 is one other than the P range based on the detection signal of the shift position sensor 39. When the judgment condition of S120 is satisfied (a gear range other than the P range is selected), the ECU 43 proceeds to S130 and determines whether or not the stop prohibition flag F is 0. When the condition of S130 is satisfied (F=0), the ECU 43 proceeds to S140 and changes the stop prohibition flag F to 1 and then ends the shift control routine.

When the condition of S130 is not satisfied (F=1), the ECU 43 proceeds to S150 and determines whether or not the vehicle 11 is traveling. The determination is made based on, for example, the speed and the manipulated state of a parking brake. When the vehicle speed is not 0 and when the parking brake is not manipulated, it is determined that the vehicle 11 is traveling. It may also be determined whether the vehicle 11 is traveling or not based on conditions other than the vehicle speed and the manipulated state of the parking brake. When the condition of S150 is satisfied (the vehicle 11 is traveling), the shift control routine is ended. When the condition of S150 is not satisfied (the vehicle 11 stops traveling), the ECU 43 proceeds to S160 and drives the motor 25 with the electromotive force of the alternator 33. The motor 25 moves the manual valve 24 and the gear range of the automatic transmission 19 is shifted to the P range. After the execution of S160, the shift control routine is ended.

When the condition of S110 is not satisfied (the battery 32 is normal), the ECU 43 proceeds to S170. When the condition of S110 is satisfied (the battery 32 is abnormal) and the judgment condition of S120 is not satisfied (the P range is selected), the ECU 43 proceeds to S170. In S170, the ECU 43 determines whether or not the stop prohibition flag F is 0. When the flag F is 0, the ECU 43 ends the shift control routine. When the flag F is 1, the ECU 43 proceeds to S180 and changes the stop prohibition flag F from 1 to 0. Then, the ECU 43 ends the shift control routine.

When the stop prohibition flag F is set to 1, a prohibition means prohibits the engine 12 from stopping. The prohibition means may invalidate manipulations carried out by the drive to stop the engine 12. For example, when the driver manipulates the ignition switch to a position that stops the engine 12, the manipulation may be invalidated. In such case, the injection of fuel by the fuel injection valves 16 continues or the ignition of the ignition plug 17 continues. In addition, the prohibition means may prevent the ignition switch from being manipulated to the position that stops the engine 12.

When the battery 32 is normal, the shift control routine proceeds in the order of S110, S170, and return. When the battery 32 is abnormal, the vehicle 11 is not traveling, and the P range is selected by the shift lever 38, the shift control routine proceeds in the order of S110, S120, S170, and return. In either case, the stop prohibition flag F is 0. Therefore, the engine 12 stops when the driver carries out manipulations to stop the engine 12.

When the battery 32 is abnormal and a gear range other than the P range is selected by the shift lever 38 (in the first control cycle in which the above-described conditions are satisfied), the shift control routine proceeds in the order of S110, S120, S130, S140, and return regardless of the traveling state of the vehicle 11, and the stop prohibition flag F is switched from 0 to 1. Therefore, the engine 12 does not stop even when the driver performs manipulations to stop the engine 12. That is, the engine 12 is prohibited from stopping.

When S140 is performed, the condition of S130 is not satisfied from the next control cycle S140. Therefore, when the conditions of S110 and S120 are satisfied and the vehicle 11 continues traveling, the shift control routine proceeds in the order of S110, S120, S130, S150, and return. In this case, since the electromotive force of the alternator 33 is supplied to each electric load, the engine 12 continues to run and the vehicle 11 may continue traveling.

When the conditions of S110 and S120 are satisfied and the vehicle stops traveling, the shift control routine proceeds in the order of S110, S120, S130, S150, S160, and return. The electromotive force of the alternator 33 drives the motor 25 to shift the gear range to the P range from one other than the P range in the automatic transmission 19. Since the conditions of S120 and S170 are not satisfied from the next control cycle, the processes are executed in the order of S110, S120, S170, S180, and return and the stop prohibition flag F is set to 0 again. Therefore, the engine 12 stops when the driver carries out manipulations to stop the engine 12.

The shift controlling method of a transmission according to the preferred embodiment has the following advantages.

(1) When a gear range other than the P range is selected by the shift lever and the vehicle 11 stops traveling, the motor 25 is operated by the electric power supplied from the alternator 33 and the gear range of the automatic transmission 19 is forcibly switched to the P range. Therefore, the gear range of the automatic transmission 19 is always shifted to the P range even when it becomes difficult to operate the motor 25 only with the battery 32 such as when a terminal of the battery 32 falls off or when the power of the battery becomes insufficient while the vehicle 11 is traveling. In the P range, the rotation of the output shaft 26 of the automatic transmission 19 is restricted and the drive wheels 31 connected to the output shaft 26 are locked. Therefore, even if the battery 32 is abnormal, the shifting of the gear range to the P range is guaranteed. Accordingly, the vehicle 11 does not move in an unexpected manner even when the driver stops the engine 12 and goes away from the vehicle 11.

For example, when the vehicle 11 stops traveling and the engine 12 stops in a state in which the N range is selected and when the P range is selected afterward by shifting the shift lever 38, the alternator 33 forcibly switches the gear range from the N range to the P range before the engine 12 is stopped. Therefore, the parking lock mechanism functions due to the selection of the P range and movement of the vehicle 11 is restricted even when the driver goes away from the vehicle 11.

(2) The condition of the battery 32 is constantly monitored. The gear range is switched to the P range only when the electric power supply from the battery 32 to the motor 25 is decreased or cut off. Therefore, when the shifting of the gear range with the battery 32 is difficult, the gear range is shifted by the electromotive force of the alternator 33. That is, the motor 25 is not driven by the electromotive force of the alternator 33 when the battery 32 has enough electric power to drive the motor 25. Thus, unnecessary range shifting is not performed.

When the battery 32 is normal, the stop prohibition flag F is 0. Thus, the engine 12 may be stopped regardless of the selected gear range.

It should be apparent to those skilled in the art that the present invention may be embodied in many other specific forms without departing from the spirit or scope of the invention. Particularly, it should be understood that the present invention may be embodied in the following forms.

Figure 2:
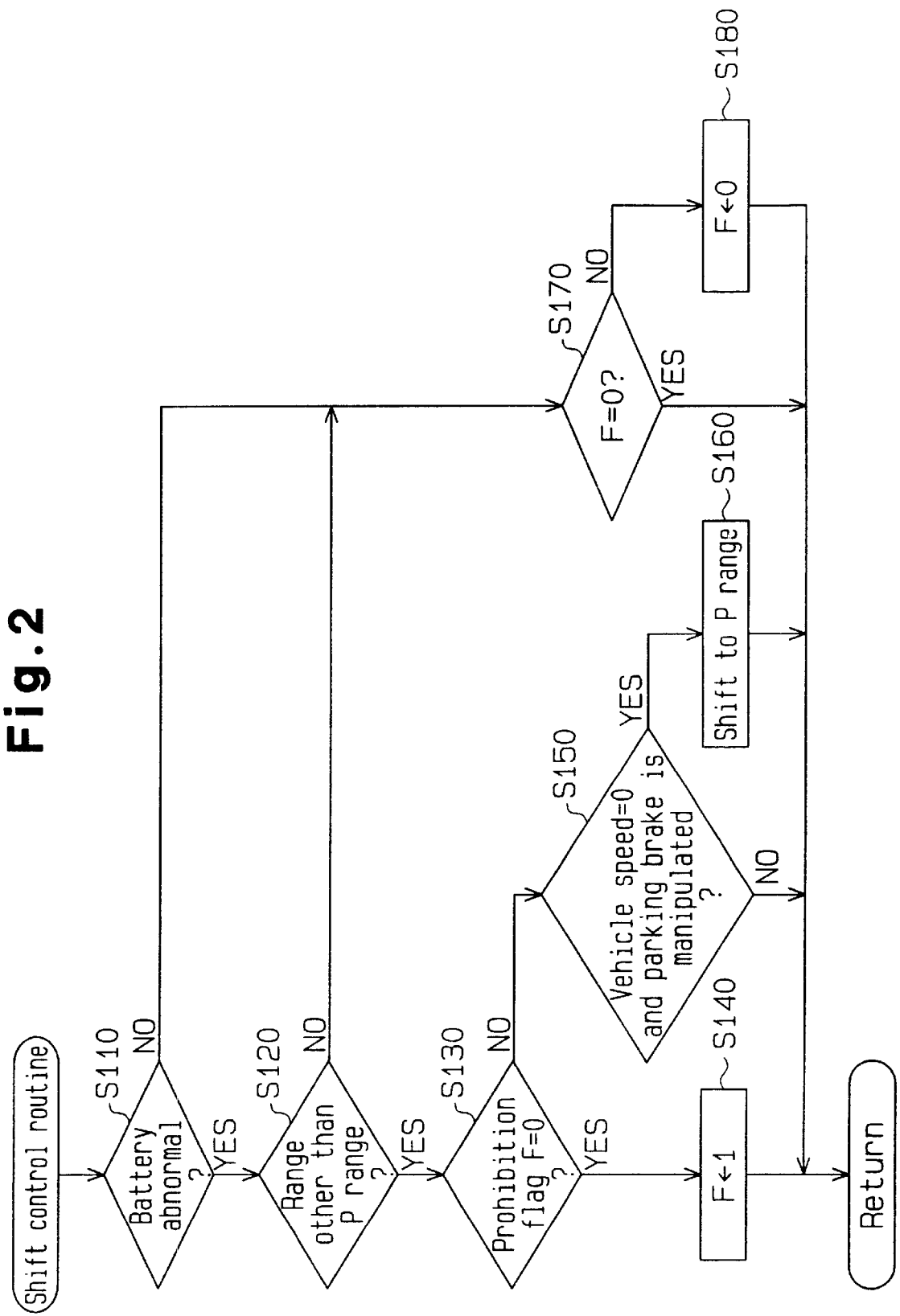
FIG. 2 is a flowchart showing a procedure for controlling the shifting of the automatic transmission.

(a) The gear range may be forcibly shifted to the P range by driving the motor 25 with the electromotive force of the alternator 33 without detecting the condition of the battery 32. In this case, S110 of FIG. 2 is omitted. Further, the gear range is switched to the P range when the vehicle 11 stops traveling regardless of whether the battery 32 is normal or abnormal. Therefore, the vehicle 11 does not move even when the driver tries to drive the vehicle 11 by, for example, depressing an acceleration pedal after the vehicle 11 stops traveling. This would let the driver know that there is an abnormality in the vehicle 11.

(b) When the vehicle 11 stops traveling and a gear range other than the P range is selected by the shift lever 38, the stopping of the engine 12 may be prohibited. In this case, steps S150 and S160 shown in FIG. 2 are omitted. This prevents the engine 12 from being stopped as long as a gear range other than the P range is selected even when it becomes difficult to drive the motor 25 only with the battery 32. This would let the driver know that there is an abnormality in the vehicle 11.

After prohibiting the stopping of the engine 12, the gear range is forcibly switched to the P range by the electromotive force of the alternator 33. Afterward, the stopping of the engine 12 is enabled. In this case, steps S150 and S160 shown in FIG. 2 are performed. This enables the engine 12 to be stopped after the gear range is forcibly shifted to the P range by the alternator 33.

(c) In addition to an automatic transmission, the shift control method of the present invention may be applied to a manual transmission. In the manual transmission, a reverse gear and a low (first) gear serve as the predetermined range. When the predetermined range is selected, it is difficult to rotate the output shaft of the transmission after the engine stops. In the manual transmission, for example, it is determined whether a gear other than the reverse and low gears is selected in S120 of FIG. 2.

(d) The shift lever 38 may be any type of shifting member as long as it can select gear ranges. For example, a switch arranged for every gear range may be used as the shifting member. In this case, when a predetermined switch is manipulated, the gear range corresponding to the switch is selected. Further, the shift lever may be rotatable so that the shift lever is rotated to shift ranges.

(e) When the gear range is forcibly shifted to the P range by the alternator 33, a warning indicating abnormality of the battery 32 may be issued. For example, an alarm lamp may be lit or flashed, or buzzer may generate a warning noise. This warns the driver of an abnormality in the battery 32 and the battery abnormality may be coped with at an early stage.

Therefore, the present examples and embodiments are to be considered as illustrative and not restrictive, and the invention is not to be limited to the details given herein, but may be modified within the scope and equivalence of the appended claims.

What is claimed is:

1. A method for controlling gear shifting of a transmission connected to an engine of a vehicle, wherein the transmission is supplied with electric power from a battery or an alternator, which is connected to the engine, drives an actuator based on manipulation of a shifting member by a driver to shift gear ranges of the transmission, and has an output shaft that becomes difficult to rotate if a predetermined range is selected when the engine stops running, the method comprising the steps of:

determining whether a gear range differing from the predetermined range is selected by the manipulation of the shifting member when the vehicle stops traveling; and forcibly shifting the gear range of the transmission to the predetermined range when a gear range differing from the predetermined range is selected by driving the actuator with electric power supplied from the alternator.

2. The method according to claim 1, further comprising the step of:

detecting the condition of the battery;

wherein the shifting step is performed when, based on the condition of the battery, the battery does not supply enough electric power to drive the actuator.

3. The method according to claim 1, wherein the transmission is an automatic transmission, and the predetermined range is a parking range.

4. A method for controlling gear shifting of a transmission connected to an engine of a vehicle, wherein the transmission is supplied with electric power from a battery or an alternator, which is connected to the engine, drives an actuator based on manipulation of a shifting member by a driver to shift gear ranges of the transmission, and has an output shaft that becomes difficult to rotate if a predetermined range is selected when the engine stops running, the method comprising the steps of:

detecting the condition of the battery;

determining whether a gear range differing from the predetermined range is selected by the manipulation of the shifting member when the vehicle stops traveling; and prohibiting the stopping of the engine when, based on the condition of the battery, the battery does not supply enough electric power to drive the actuator and a gear range differing from the predetermined range is selected.

5. The method according to claim 4 further comprising the steps of:

forcibly shifting the gear range of the transmission to the predetermined range by driving the actuator with electric power supplied from the alternator; and enabling the stopping of the engine.

6. A controller for controlling gear shifting of a transmission connected to an engine of a vehicle, wherein the controller is supplied with electric power from a battery or an alternator, which is connected to the engine, and drives an actuator based on manipulation of a shifting member by a driver to shift gear ranges of the transmission, and wherein the transmission has an output shaft that becomes difficult to rotate if a predetermined range is selected when the engine stops running, the controller comprising:

a control unit for determining whether a gear range differing from the predetermined range is selected by the manipulation of the shifting member when the vehicle stops traveling, wherein the control unit forcibly shifts the gear range of the transmission to the predetermined range when a gear range differing from the predetermined range is selected by driving the actuator with electric power supplied from the alternator.

7. The controller according to claim 6, wherein the control unit detects the condition of the battery, and shifts the gear range of the transmission to the predetermined range when, based on the condition of the battery, the battery does not supply enough electric power to drive the actuator.

8. The controller according to claim 6, wherein the transmission is an automatic transmission, and the predetermined range is a parking range.

9. A controller for controlling gear shifting of a transmission connected to an engine of a vehicle, wherein the controller is supplied with electric power from a battery or an alternator, which is connected to the engine, and drives an actuator based on manipulation of a shifting member by a driver to shift gear ranges of the transmission, and wherein the transmission has an output shaft that becomes difficult to rotate if a predetermined range is selected when the engine stops running, the controller comprising:

a control unit for detecting the condition of the battery, determining whether a gear range differing from the predetermined range is selected by the manipulation of the shifting member when the vehicle stops traveling, and prohibiting the stopping of the engine when, based on the condition of the battery, the battery does not supply enough electric power to drive the actuator and a gear range differing from the predetermined range is selected.

10. The controller according to claim 9, wherein, subsequent to prohibiting the stopping of the engine, the control unit forcibly shifts the gear range of the transmission to the predetermined range by driving the actuator with electric power supplied from the alternator and then enables the stopping of the engine.

* * * * *